US011181604B2

(12) United States Patent
Schühler et al.

(10) Patent No.: US 11,181,604 B2
(45) Date of Patent: Nov. 23, 2021

(54) APPARATUS AND METHOD FOR DETERMINING A POSITION OF A TRANSMITTER

(71) Applicant: Fraunhofer-Gesellschaft zur Foerderung der angewandten Forschung e.V., Munich (DE)

(72) Inventors: Mario Schühler, Effeltrich (DE); Lars Weisgerber, Ebersbach-Neugersdorf (DE); Johannes Arendt, Erlangen (DE); Rainer Wansch, Baiersdorf (DE); Heinrich Milosiu, Erlangen (DE); Frank Oehler, Adelsdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 492 days.

(21) Appl. No.: 16/052,833

(22) Filed: Aug. 2, 2018

(65) Prior Publication Data

US 2018/0341001 A1 Nov. 29, 2018

Related U.S. Application Data

(63) Continuation of application No. PCT/EP2017/053054, filed on Feb. 10, 2017.

(30) Foreign Application Priority Data

Feb. 12, 2016 (DE) ..................... 10 2016 202 208.3
Jul. 20, 2016 (DE) ..................... 10 2016 213 226.1

(51) Int. Cl.
*G01S 3/40* (2006.01)
*G01S 3/28* (2006.01)

(52) U.S. Cl.
CPC . *G01S 3/40* (2013.01); *G01S 3/28* (2013.01)

(58) Field of Classification Search
CPC ..................................... G01S 3/28; G01S 3/40
See application file for complete search history.

(56) References Cited

U.S. PATENT DOCUMENTS

| 4,638,317 A | 1/1987 | Evans |
| 8,433,337 B2 | 4/2013 | Chin |
| (Continued) | | |

FOREIGN PATENT DOCUMENTS

| JP | S61-155781 | 7/1986 |
| JP | H10-186012 | 7/1998 |
| (Continued) | | |

OTHER PUBLICATIONS

A. Kalis, et al. "Direction Finding in IEEE 802.11 Wireless Networks", IEEE Transactions on Instrumentation and Measurement, vol. 51, No. 5, pp. 940-948, Oct. 2002.
(Continued)

*Primary Examiner* — Dao L Phan
(74) *Attorney, Agent, or Firm* — Dicke, Billig & Czaja, PLLC

(57) ABSTRACT

An apparatus for determining information on a position of a transmitter. In one example, the apparatus includes an antenna apparatus, a control apparatus and a data processing apparatus. The antenna apparatus includes several different directional characteristics, wherein the directional characteristics are each related to an amount of spatially different receive sensitivities of the antenna apparatus. The control apparatus influences the antenna apparatus such that at least one of the directional characteristics of the antenna apparatus is activated. With the activated directional characteristic, the antenna apparatus receives a signal originating from the transmitter. The data processing apparatus processes the received signal and the amount of spatially different receive sensitivities allocated to the related activated directional characteristic to an amount of weighted receive values and determines the information on the position of the transmitter therefrom. Further, the invention relates to a respective method.

13 Claims, 3 Drawing Sheets

(56) References Cited

U.S. PATENT DOCUMENTS

| | | | |
|---|---|---|---|
| 2004/0127230 A1 | 7/2004 | Bevan et al. | |
| 2009/0054106 A1 | 2/2009 | Antolovic et al. | |
| 2013/0095770 A1* | 4/2013 | Moshfeghi | H04W 72/046 |
| | | | 455/73 |
| 2014/0162691 A1 | 6/2014 | Wu | |
| 2014/0327576 A1* | 11/2014 | Kumar | H04B 7/088 |
| | | | 342/367 |
| 2015/0309152 A1 | 10/2015 | Pajona et al. | |
| 2016/0223651 A1* | 8/2016 | Kamo | G01S 13/426 |

FOREIGN PATENT DOCUMENTS

| | | |
|---|---|---|
| JP | 2004-333414 | 11/2004 |
| JP | 2005-207837 | 8/2005 |
| JP | 2010-048637 | 3/2010 |

OTHER PUBLICATIONS

B. N. Hood, et al. "Estimating DoA from Radio-Frequence RSSI Measurements Using an Actuated Reflector", IEEE Sensors Journal, vol. 11, No. 2, pp. 413-417, Feb. 2011.

Gianni Giorgetti, et al. "Single-Anchor Indoor Localization using a Switched-Beam Antenna", IEEE Communications Letters, vol. 13, No. 1, pp. 1-3, Jan. 2009.

M. Passafiume, et al. "On the Duality of Phase-based and Phase-less RSSI MUSIC Algorithm for Direction of Arrival Estimation", Recent Advances in Electrical and Electronic Engineering, 2014.

D. L. Nguyen, "Switched Beam Array Antenna for 2 45 GHz RFID Localisation", Ph D. Dissertation, The University of Hull, Nov. 2011.

C. Volmer, et al. "An Eigen-Analysis of Compact Antenna Arrays and its Application to Port Decoupling", vol. 56, No. 2, pp. 360-370, Feb. 2008.

J. Shelton, et al. "Multiple Beams from Linear Arrays", vol. 9, No. 2, pp. 154-161, Mar. 1961.

UHF RFID Ultra Low Range 520-10092, Datasheet, Kathrein, 2010.

UHF FID Low Range-Antenne 52010084, Datasheet, Kathrein, 2012.

Kathrein RFID KRAI Solutions EuroID_2013, UHF RFID System der 3. Generation—die Zukunft der drahtlosen Identifikation—100% Identification Technology—KRAI Kathrein RFID Antenna Interface, EuroID 2013.

* cited by examiner

US 11,181,604 B2

APPARATUS AND METHOD FOR DETERMINING A POSITION OF A TRANSMITTER

CROSS-REFERENCE TO RELATED APPLICATIONS

This application is a continuation of copending International Application No. PCT/EP2017/053054, filed Feb. 10, 2017, which is incorporated herein by reference in its entirety, and additionally claims priority from German Applications Nos. 10 2016 202 208.3, filed Feb. 12, 2016, and 10 2016 213 226.1, filed Jul. 20, 2016, which are all incorporated herein by reference in their entirety.

The invention relates to an apparatus for determining at least one piece of information on a position of a transmitter. Further, the invention relates to a respective method for determining information on a position of a transmitter.

BACKGROUND OF THE INVENTION

Modern receiving means for radio systems frequently necessitate additional determination of the direction from which the transmitters transmit. In that process, the received signals have to be processed together with their directional information.

For this, conventional systems for directional resolution mostly use several individual antennas having high directivity, wherein one individual receiver per antenna is provided. The received data of the receive lines or routes are evaluated with direction-finding algorithms, such as MUSIC ("Multiple Signal Characterization") or ESPRIT ("Estimation of Signal, Parameters via Rotational Invariance Technique"). In radio positioning technology, a line or also receive line generally means the receive path that originates from the antenna or possibly the respective antenna element and leads to the apparatus (in particular a direction-finding receiver) that evaluates the antenna signal.

In a simplified system configuration, normally, only one value for the field strength of the received signals is available for evaluation, i.e. in particular the RSSI value (RSSI="Received Signal Strength Indication"). Thus, the phase information needed for direction finding is lacking.

[1] presents an RSSI-based method for direction-finding in wireless networks. By successively switching radiation diagrams with decreasing beam width, the transmitter to be found can be allocated to one sector. Here, however, the resolution accuracy of the direction of incidence is only given by the most narrow beam width, which results in large antenna apertures and expensive beam-forming networks, respectively.

Regarding resolution accuracy, the approach presented in [2] also depends on the beam width. Here, a fixed main beam is mechanically pivoted until the direction having the strongest RSSI value has been found.

A further RSSI-based method is shown in [3]. Here, an allocation between RSSI value and direction in space is obtained by the spatial arrangement of the antennas. Here, the resolution depends on the beam width of the individual radiators.

An RSSI-based approach in combination with the direction estimation algorithm MUSIC is presented in [4]. By searching for the suitable steering vector, the signal covariance matrix is inferred without measuring any phase information. The accuracy of the approach relates strongly to the directivity of the individual antennas.

U.S. Pat. No. 8,433,337 B2 shows an approach where the signals from two antennas are combined with one another in four different ways via a 90° hybrid coupler and an additional switchable phase shifter. Thereby, the phase information is converted into amplitude information such that the phase relation between two antennas can be inferred from the RSSI values. Even with more than two antennas, the same are combined in pairs while the different pairs are activated after one another.

Thus, in conventional technology, several antenna apparatuses are needed, which results in increased space requirements and in mounting requirements in the application, respectively.

Alternatively, mechanical components are needed that move the respective antenna apparatuses, which also results in respective space requirements or wear and tear.

SUMMARY

According to an embodiment, an apparatus for determining at least one piece of information on a position of a transmitter may have: an antenna apparatus, a control apparatus and a data processing apparatus, wherein the antenna apparatus includes several different directional characteristics, wherein the directional characteristics each relate to an amount of spatially different receive sensitivities of the antenna apparatus, wherein the control apparatus influences the antenna apparatus such that at least one of the directional characteristics of the antenna apparatus is activated, wherein the antenna apparatus with the activated directional characteristics receives at least one signal originating from the transmitter, and wherein the data processing apparatus processes the at least one received signal and the amount of spatially different receive sensitivities allocated to the activated directional characteristic to an amount of weighted receive values and determines the information on the position of the transmitter at least from the amount of weighted receive values.

Another embodiment may have a method for determining information on a position of a transmitter, wherein at least one signal originating from the transmitter is received with at least one directional characteristic related to an amount of spatially different receive sensitivities, wherein the at least one received signal and the amount of spatially different receive sensitivities allocated to the related directional characteristic are processed to an amount of weighted receive values and wherein the information on the position of the transmitter is determined at least from the amount of weighted receive values.

According to another embodiment, an apparatus for determining at least one piece of information on a position of a transmitter may have: an antenna apparatus, a control apparatus and a data processing apparatus, wherein the antenna apparatus includes several different directional characteristics, wherein the directional characteristics each relate to an amount of spatially different receive sensitivities of the antenna apparatus, wherein the control apparatus influences the antenna apparatus such that several different directional characteristics of the antenna apparatus are activated, wherein the antenna apparatus receives at least one signal originating from the transmitter for each activated directional characteristics, and wherein the data processing apparatus processes the received signals and the amount of spatially different receive sensitivities allocated to the respectively activated directional characteristic to an amount of weighted receive values related to the respectively activated directional characteristic and processes the amounts of weighted receive values related to the different directional characteristics together and determines the information on the position of the transmitter at least from the amounts of weighted receive values.

The invention relates to an apparatus for determining at least one piece of information on a position of a transmitter. Here, the apparatus comprises an antenna apparatus, a control apparatus and a data processing apparatus. The antenna apparatus comprises several different directional characteristics, wherein the directional characteristics each relate to an amount of spatially different receive sensitivities of the antenna apparatus. The control apparatus influences the antenna apparatus such that at least one of the directional characteristics of the antenna apparatus is activated. The antenna apparatus receives at least one signal originating from the transmitter, wherein this takes place with the activated directional characteristic. Further, the data processing apparatus processes the at least one received signal and the amount of spatially different receive sensitivities allocated to the activated directional characteristic to an amount of weighted receive values. Additionally, the data processing apparatus determines the information on the position of the transmitter at least from the amount of weighted receive values.

The apparatus for determining a piece of information on a position of a transmitter comprises an antenna apparatus for receiving signals of the transmitter. The received signals are processed by a data processing apparatus to determine the information therefrom. The antenna apparatus is characterized in that the same comprises several different directional characteristics. Here, the directional characteristics relate to the spatial distribution of the receive sensitivities. Thus, signals are not received evenly from all spatial directions but there are areas from which the antenna apparatus receives signals. This has the effect that, when receiving the signal with a selected and activated directional characteristic, a connection exists between the position of the transmitter and the received signal. This connection is used by the data processing apparatus that is configured to process the received signal and data on the directional characteristic used during reception, which is hence activated, and the amount of spatially different receive sensitivities, respectively. From the received signal and the data on the distribution of the receive sensitivities, the data processing apparatus determines an amount of weighted receive values. Then, the information can be determined from the amount of weighted receive values. The control apparatus has the purpose that at least one directional characteristic of the antenna apparatus is activated. In one configuration, several directional characteristics are activated, such that overlapping directional characteristics occur.

In one configuration, the amplitudes and phases of the signals are available for evaluating the received signals. In an alternative configuration, only the amplitudes of the signals are processed.

In one configuration, it is intended that the control apparatus influences the antenna apparatus such that several different directional characteristics of the antenna apparatus are activated. In one configuration, the directional characteristics are particularly activated one after the other. Here, the antenna apparatus receives at least one signal of the transmitter for each activated directional characteristic. The data processing apparatus processes the received signals and the amount of spatially different receive sensitivities allocated to the respectively activated directional characteristic to a respective amount of weighted receive values related to the respectively activated directional characteristic. Additionally, the data processing apparatus processes the amounts of weighted receive values related to the different directional characteristics together.

In this configuration, signals of the transmitter with different activated directional characteristics are received and processed accordingly in that the received signals are processed with the data of the respectively used directional characteristics to the weighted receive values. By using different directional characteristics and the accompanying different information, any ambiguities can be canceled and more precise information on the position of the transmitter can be determined. Also, in the case that several transmitters exist, their signals can be separated from one another.

The following configurations deal with the processing of data of the received signals and the respectively activated directional characteristics by the data processing apparatus.

One configuration includes that the data processing apparatus processes data describing the received signals and the amount of spatially different receive sensitivities of the respectively activated directional characteristics existing in matrix form together in order to obtain the amounts of weighted receive values also in the form of matrices. In one configuration, the data of the received signals and the matrices allocated to the directional characteristics are multiplied with one another.

In one configuration, the data processing apparatus also serves to record data and signals. For this, the data processing apparatus in particular comprises a data memory.

In one configuration, it is intended that the data processing apparatus adds up at least one group of the amounts of weighted receive values related to different directional characteristics. By adding the amounts of weighted receive values, in one configuration, accumulation points result, which allow the identification of the position of the transmitter. Here, in one configuration, the group relates to part of the determined amounts of weighted receive values and is hence a subgroup. In an alternative configuration, the group relates to all amounts of weighted receive values that are available for the data processing apparatus.

In one configuration, the data processing apparatus determines a difference between at least two groups of the amounts of weighted receive values. In one configuration, at least one of the two groups of the amounts of weighted receive values comprises only one amount of the weighted receive values and hence only the data of the signal reception with activated directional characteristic.

In one configuration, it is intended that the two groups overlap. Thus, in this configuration, there is at least one common amount of weighted receive values in both groups.

In an alternative configuration, the two groups are disjoint, such that only respectively different amounts of weighted receive values are within the groups.

In one configuration, it is intended that the data processing apparatus digitizes the received signals prior to further processing. Thus, in this configuration, at least one analog-digital converter is provided that converts the analog signals of the antenna apparatus to digital signals. In an alternative configuration, the antenna apparatus comprises at least one analog-digital converter such that the antenna apparatus outputs already digitized signals to the data processing apparatus.

One configuration includes that the antenna apparatus is a multi-beam antenna. With regards to the receive sensitivity (hence also for the transmission characteristics), a multi-beam antenna comprises several beams or at least several main beams. The beams are allocated to different directional characteristics. This is accompanied by the fact that there is a main direction or a main area allocated to the respective beam or main beam, respectively, in the directional characteristics. Or, in other words, for each activated directional characteristic, signals are mainly received from a spatial area in which the respective allocated (receive) beam lies.

Thus, in this configuration, receive data and receive signal processing, respectively, takes place in connection with a multi-beam antenna.

Thus, the invention relates generally to the provision and separation of information from received (radio) signals from different directions of incidence, each connected to the directional characteristics, by using an antenna apparatus. Thus, in one configuration, the antenna apparatus comprises several antenna elements that are controlled by a beamforming network in a further configuration. In a further configuration, the data processing allows essentially simultaneous analysis and further processing of the received signals (in one configuration in particular electromagnetic signals).

The following configurations relate in particular to the antenna apparatus in the form of a multi-beam antenna.

In one configuration, it is intended that the directional characteristics of the antenna apparatus configured as multi-beam antenna differ from one another by the direction of the beams. Here, in one configuration, the beams are mainly the main beams that are given by a main direction of the respective directional characteristic.

One configuration includes that the antenna apparatus configured as multi-beam antenna comprises an individual signal output for each switchable directional characteristic. In one configuration, it is intended that the antenna apparatus receives signals with several directional characteristics and that it is possible to separate the simultaneously received signals with regard to their respective directional characteristics by the antenna apparatus itself or a downstream component, such that individual signals result that are each allocated to a directional characteristic. In one configuration, activation of the directional characteristic means selecting the directional characteristic and evaluating the signal received with the activated directional characteristic. Alternatively, activating relates to electronic activating, such that signals can only be received from the antenna apparatus with a directional characteristic.

In one configuration, it is intended that, per activated directional characteristic, only the signal of one signal output of the antenna apparatus is available for the data processing apparatus. Thus, in this configuration, the data processing apparatus processes only one received signal that is allocated to the respectively activated directional characteristic. In one configuration, the received signals are processed after all directional characteristics have been activated.

One configuration includes that, per activated directional characteristic, the signals of several signal outputs of the antenna apparatus are available for the data processing apparatus. Thus, in this configuration, the data processing apparatus processes not only the signal of an activated and hence specifically selected directional characteristic, but also the signals that are allocated to other directional characteristics.

In one configuration, it is intended that the data processing apparatus presents the amounts of weighted receive values in a color-coded manner on at least one visualization apparatus.

One configuration includes that the data processing apparatus adds up a group of the amounts of weighted receive values and determines the information on the position of the transmitter at least from an accumulation area of the received signals. Thus, it is determined from what spatial area or from what direction in relation to the antenna apparatus the signals mainly originate.

In one configuration, it is provided that the data processing apparatus determines the presence of several transmitters from a difference between at least two groups of the amounts of weighted receive values. If, for example, two accumulation areas result, this indicates the presence of two transmitters.

In one configuration, the data processing apparatus determines an intermediate result for the information on the position of the transmitters and starting therefrom the directional characteristics that cover spatial areas matching the intermediate result are activated for further steps.

One configuration includes that the antenna apparatus emits at least one signal so that a signal originates from the transmitter. In this configuration, the transmitter is stimulated to emit at least one signal. Here, it is intended in one configuration that the transmitter receives energy for emitting a signal by the signal originating by the antenna apparatus. In an alternative configuration, the signal emitted from the transmitter is a reflection signal that results by the reflection of the signal originating from the antenna apparatus at the transmitter. In this configuration, the transmitter is, for example, an RFID tag.

One configuration includes that the antenna apparatus and the data processing apparatus are configured to receive and to process signals actively generated by the transmitter as signals originating from the transmitter. In one configuration, the transmitter actively generates signals by automatically emitting signals. In a further configuration, the transmitter is activated by the signal of the antenna apparatus and then actively emits signals. In one configuration, active generation means also receiving and emitting signals with specific changes, e.g. shifting the frequency or imprinting information.

In one configuration, it is provided that the antenna apparatus and the data processing apparatus are configured to receive and process signals reflected by the transmitter as signals originating from the transmitter. Thus, in this configuration, the transmitter is, for example, an object irradiated by radar signals and reflecting the signals accordingly.

In one configuration, it is provided that the data processing apparatus determines an uncertainty of the determined information on the position of the transmitter in dependence on a beam width of the beams of the activated directional characteristics of the antenna apparatus configured as multi-beam antenna.

Further, the invention solves the object by a method for determining information on a position of a transmitter. Here, at least one signal originating from the transmitter is received. This takes place with at least one directional characteristic related to an amount of spatially different receive sensitivities. Additionally, the at least one received signal and the amount of spatially different receive sensitivities allocated to the related directional characteristic are processed to an amount of weighted receive values. The information on the position of the transmitter is determined at least from the amount of weighted receive values.

In one configuration, at least one directional characteristic of an antenna apparatus is activated.

The configurations of the apparatuses can also be realized accordingly by the method such that the allocated statements apply accordingly. This also applies vice versa such that the method can also be realized by the apparatus.

In one configuration, the invention includes a combination of a multi-beam antenna with directional characteristics that can be activated and the data processing apparatus consisting, in one configuration, of a signal receiver with signal processing (e.g. in the form of a "digital signal processor", DSP or a "field programmable gate array", FPGA or a CPU or a microprocessor, e.g. based on an ARM architecture). Optionally, in one configuration, a data memory is provided. In one configuration, the apparatus serves to localize radio transmitters and radio transponders, respectively, e.g. RFID transponders. In one configuration, the apparatus allows the division of the receive signals into different directions of incidence and hence into the different directions of the transmitters.

In detail, a plurality of options exist for configuring and developing the inventive apparatus and the inventive method further. Therefore, reference is made, on the one hand, on the claims and on the other hand, on the following description of embodiments in connection with the drawings.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
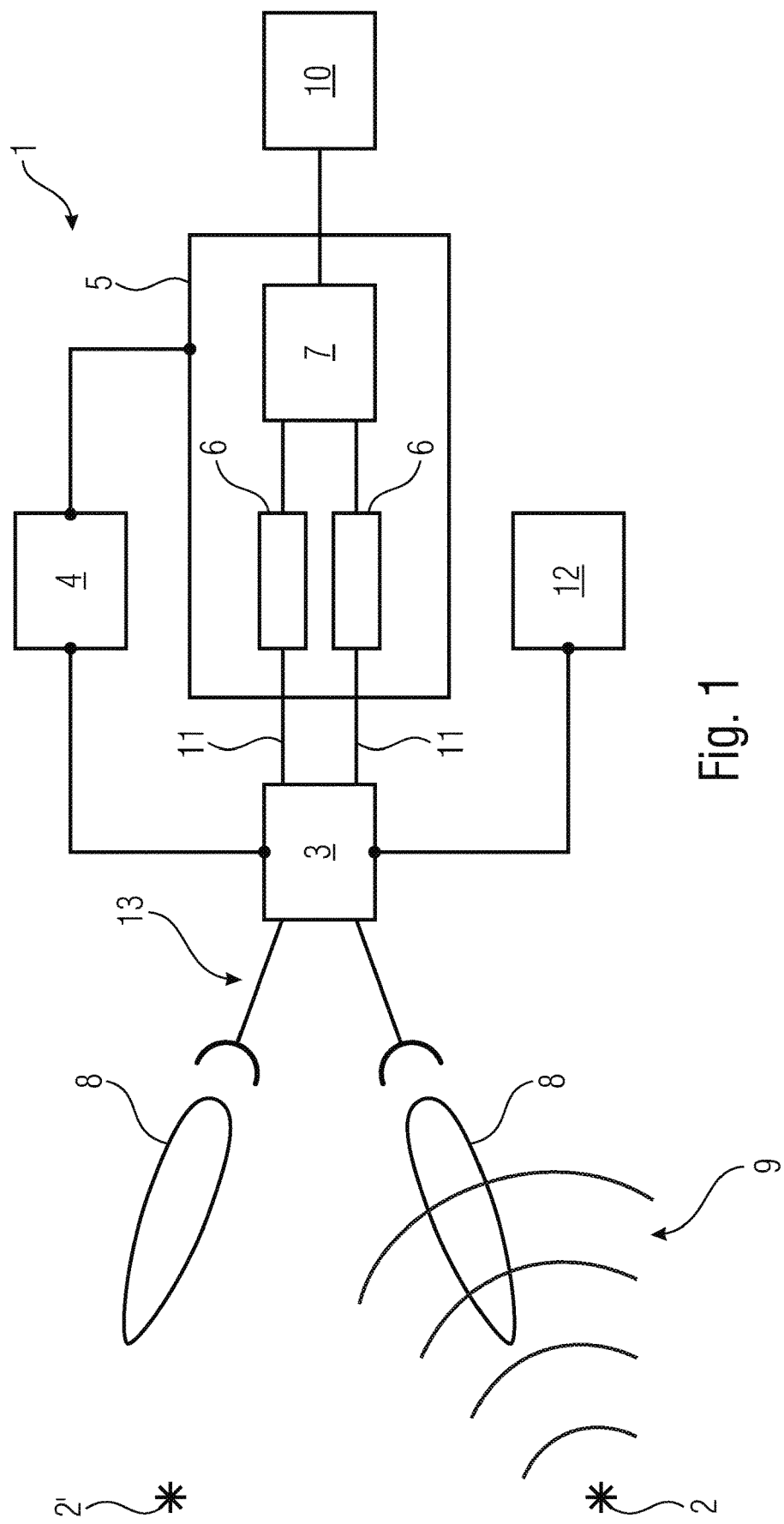
FIG. 1 is a schematic illustration of an inventive apparatus and its application.

FIG. 1 shows an application of the inventive apparatus 1, which is used here for determining the positions of two different transmitters, 2, 2' (e.g. RFID transponder or generally radio transmitter), i.e. to localize the same. For this, the apparatus 1 comprises an antenna apparatus 3 comprising several antenna elements 13, two of which are illustrated herein exemplarily. The antenna apparatus 3 is controlled via a control apparatus 4 that is also connected to a data processing apparatus 5.

Two ADC converters 6 are provided in the data processing apparatus 5, which convert signals received from the antenna apparatus 3 in digital form and that each belong to a receive line. In an alternative configuration (not illustrated), the ADC converters are components of the antenna apparatus 3 (which can alternatively also be referred to as receiver), such that the data processing apparatus 5 receives the digital signals directly. Then, the digital signals are processed by a computing apparatus 7.

The antenna apparatus 3 has several specific directional characteristics 8. The control apparatus 4 activates the directional characteristic 8 for receiving signals 9 originating from the transmitters 2, 2' (for example by active generation or by reflection).

The antenna apparatus 3 comprises signal outputs 11, each allocated to a specific directional characteristic 8. The antenna apparatus 3 is further configured such that the signal that has been received with the respectively allocated directional characteristic 8 is output at each signal output 11. This takes place here, for example, via a Butler Matrix. In an alternative configuration, an eigenmode network is generated.

Thus, in one configuration, the data processing apparatus 5 receives the received signals simultaneously from several directional characteristics, i.e. from several signal outputs 11. In an alternative configuration, where for example only one receive line is needed, the data processing apparatus 5 respectively receives only the signal received with one directional characteristic, wherein in one configuration, switching between the directional characteristics is performed according to a predetermined scheme.

In one configuration, switching between the directional characteristics is performed after some type of intermediate evaluation. Here, for example, a direction from which the received signals mainly originate is determined, such that in the following measurements those directional characteristics that relate to this determined direction are advantageous.

The data processing apparatus 5 (e.g. realized as DSP or FPGA and possibly part of the antenna apparatus 3) evaluates the received signals such that the same falls back on the data describing the directional characteristics. The directional characteristics mean in particular that the antenna apparatus 3 comprises a respectively allocated receive sensitivity. Thus, depending on the directional characteristic, spatially distributed areas having higher and lower sensitivity for receiving signals exist. In one configuration, the data on the sensitivities determined, for example by measurements and/or theoretical considerations, are stored for further processing, such that the same can be regarded as matrices. In one configuration, the directional characteristics are in particular characterized by one beam that specifies a main direction.

The data processing apparatus 5 processes, for example, the digitized received signal and the directional characteristics together in that the data are multiplied in a matching manner, i.e. in that the received signals are mapped onto the directional characteristics and weighted receive values result. In the sensitivities of the directional characteristics captured as matrices, one matrix having the weighted receive values results per directional characteristic. Multiplication is then performed, for example, by accessing already stored tables or pairs of values. Alternatively, in one configuration, signals for individual directional characteristics are received at different times. In stationary transmitters, this allows improvement of the measurement accuracy and possibly allows the detection of a movement of a transmitter.

For determining the positions of the transmitters 2, 2', the weighted receive values are processed together. Thus, in one configuration, the matrices with the weighted receive values are added. In a further configuration, at least two groups (or subgroups) of the weighted receive values are added up and subsequently the difference between the two sum matrices is taken. In that way, for example, the signals of the transmitters 2, 2' positioned at two different positions can be separated from one another. For common processing, the weighted receive values relate at least partly to the same spatial areas around the apparatus 1.

In one configuration, the weighted receive values are displayed by using a predeterminable color scale (or as in FIG. 3 with a scale of gray tones) on a visualization apparatus 10, such as a monitor, smartphone, a tablet, a handheld or VR glasses.

Thus, the inventive method includes at least the following steps:

A directional characteristic of the antenna apparatus relating to a specific distribution of the spatial sensitivity of the antenna apparatus is activated. Here, a respectively allocated distribution of the sensitivities is known, e.g. by previous calibration measurements or by theoretical knowledge on the antenna apparatus and its characteristics. Activating directional characteristics means that signals received via the activated directional characteristic are available for evaluation or further processing or are, for example, registered.

A signal of the transmitter is received with the activated directional characteristic and processed with the data on the directional characteristic, such that weighted receive values result. In one configuration, the sensitivity distribution is described by a matrix that is multiplied with the data of the received signal.

For the different directional characteristic, at least one signal each is received and evaluated. Subsequently, the information on the position of at least one transmitter is determined from the resulting weighted receive values. Depending on the configuration, the information relates, for example, to a direction or position relative to the apparatus and relative to an antenna apparatus, respectively. The information relates possibly also to the relative position of two transmitters to one another or to the change of the position, etc.

In the illustrated example, the apparatus 1 comprises a signal source 12, which serves to generate excitation or request signals. The signals of the signal source 12 are radiated with a selected directional characteristic in the direction of the transmitters 2, 2'. The respectively activated directional characteristic results in one configuration in that several directional characteristics used for receiving the signal and allocated to the antenna elements are activated together and thus superimposed.

Radiating the excitation signals allows measuring passive transmitters and their position, respectively, in that the same are activated by the excitation signal to radiate signals and/or obtain the needed energy. The latter relates in particular to the case that the transmitters are RFID tags. In a further configuration, the transmitters radiate the signals by reflection. This is for example the case for a radar application. This means that the signal source 12 generates radar signals and that the transmitters 2, 2' act as reflectors.

Optionally, a data memory and/or control unit (e.g. a server PC) exist. Thereby, a server and possibly further clients can influence the data processing apparatus 5 by control data.

Figure 2:
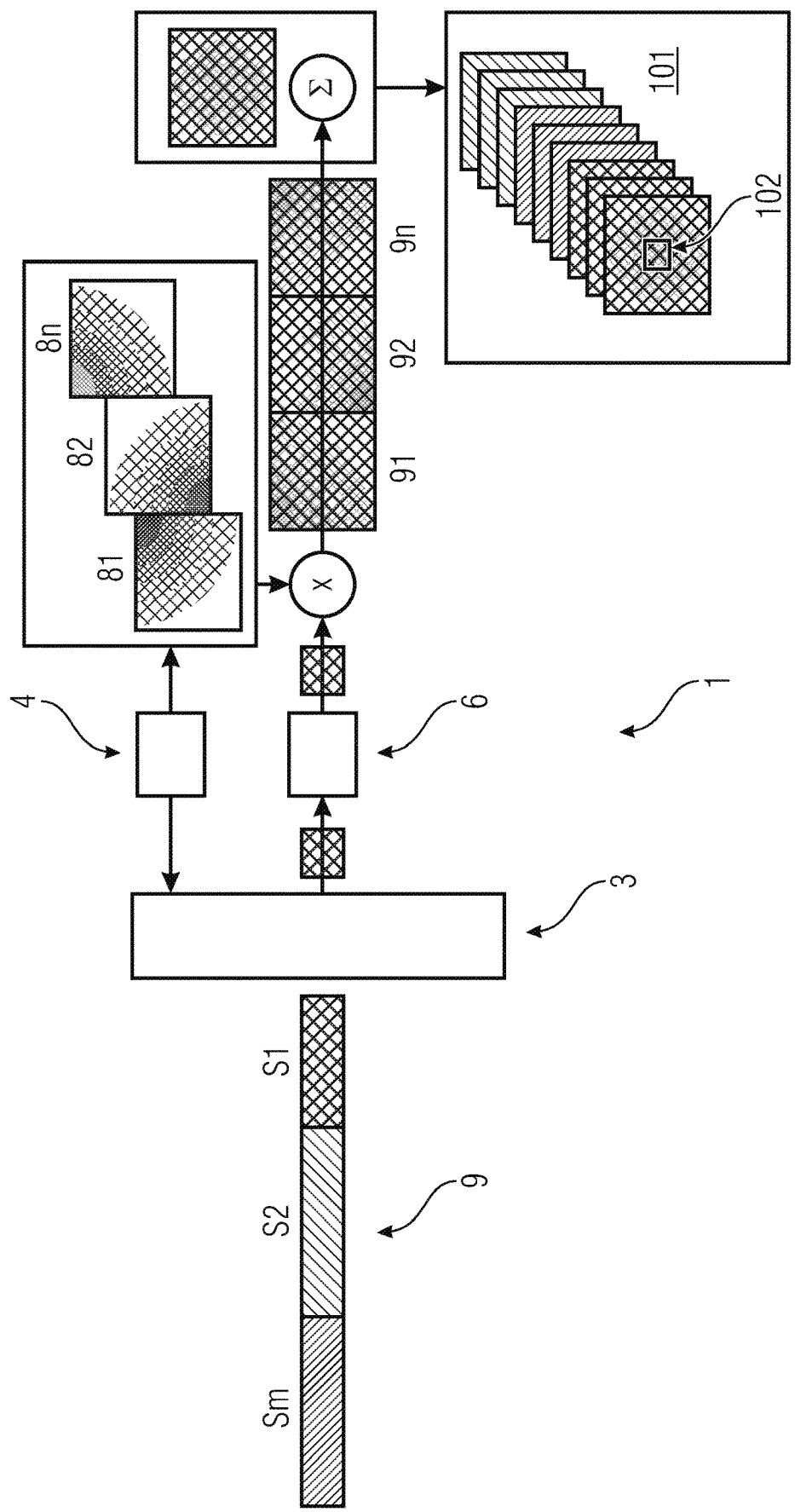
FIG. 2 is a schematic diagram for illustrating the method with a configuration of the apparatus and FIG. 3 is a schematic diagram with a further configuration of the apparatus.

The principle of the invention, in particular with regard to their evaluation, is illustrated by FIG. 2 based on one configuration.

A transmitter (not illustrated) transmits signals S1, S2 . . . Sm, which are interpreted as symbols. The signals S1, S2 . . . Sm are received by a multi-beam antenna 3. The control unit 4 activates the beams of the multi-beam antenna 3 according to a predetermined pattern and activates the different directional characteristics, respectively. In one configuration, the pattern for switching between the directional characteristics is performed arbitrarily. In a different configuration, specified directions are provided, such that those beams are activated that point in these specified directions.

The signals 9 from the controlled beam are demodulated and digitized by a receive line.

The digitized signals are each multiplied with the directional characteristic 81, 82 . . . 8n, which is allocated to beams selected by the control unit 4 (see the multiplication sign and the top box with three directional characteristics). This results in one matrix each with weighted receive values 91, 92, . . . , 9n.

The matrices 91, 92, . . . , 9n are summed up (illustrated by an Σ sign) and are stored, for example, in a memory 101.

In an alternative configuration, a subset (or group) of the matrices is summed up. Still, different subsets of the matrices can be formed and summed up. This allows the detection of multiple paths of the signals or the detection of several radio signals and transmitters, respectively.

In that way, in one configuration, a subset U1 is formed of matrices 91 and 92. A further subset U2 is formed of matrices 91, 92 and 93, etc. The comparison between the summed up subsets can give an indication of the number of radio transmitters and transponders, respectively and the presence of multiple paths. The subsets or groups can be overlapping or non-overlapping.

In the illustrated example, the desired signal 102 is taken from the stored matrices.

Alternatively, at least one matrix of the weighted receive values is transferred to a visualization unit as receive value matrix. Visual direction finding is performed, for example, by coloring the matrix values. Optionally, the maximum of the matrix can be sought and marked. Optionally, a desired field of the matrix can be digitally processed further or can be transferred to a further processing unit via a digital analog converter.

Figure 3:
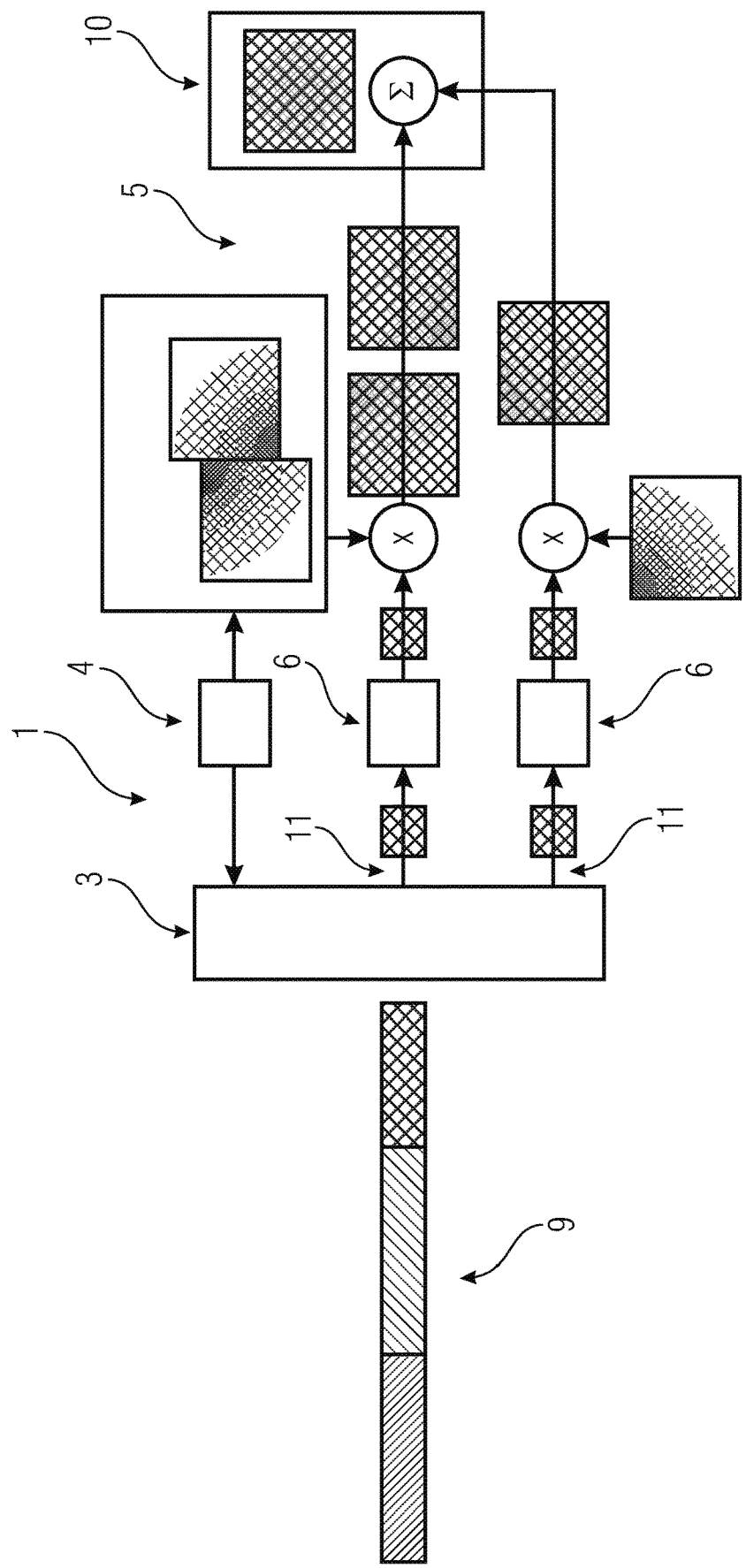

FIG. 3 shows a parallel processing of several receive lines, i.e. paths for receiving signals from the antenna to the evaluation apparatus when using a multi-beam antenna 3 having several outputs 11.

Parallel processing of several receive lines is enabled by using a multi-beam antenna 3 having several (here two) outputs 11 and advantageously several receive lines.

If several outputs 11 of the multi-beam antenna 3 and hence several receive lines are available, several paths can be processed in the data processing apparatus 5. This relates in particular to the case that the multi-beam antenna 3 can output, even when only one directional characteristic is activated, the signals received with the other directional characteristics. For this, for example, the Butler Matrix is realized in the antenna apparatus 3.

It is an advantage of the invention that one antenna apparatus 3 is sufficient to localize a transmitter and simultaneously also evaluate the emitted signals.

In one configuration, the evaluation is limited to multiplying the received signals with the data of the respective directional characteristic. In one configuration, merely those weighted receive signals are added up, such that here also hardly any processing effort arises. In particular, no complex data are needed.

In one configuration that reduces the processing effort further, the data amounts to be processed are reduced in that only selected partial areas of the data existing in the form of matrices corresponding to the desired directions are evaluated.

In one configuration, the antenna apparatus comprises several individual antennas which are connected to the receive unit by a switching matrix.

Fields of application are, for example in the area of logistics. The apparatus allows the management of objects within warehouses and production environments or allows autonomous navigation of industrial trucks.

A further application is in the field of production for the management of work pieces and work piece carriers.

Further applications are generally direction finding of transmitters, message transmission or specifically mobile radio. Further, there is the measurement of throughput speeds of objects provided with transmitters.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] A. Kalis et al., "Direction Finding in IEEE802.11 Wireless Networks," IEEE Transactions on Instrumentation and Measurement, vol. 51, no. 5, pp. 940-948, October 2002.

[2] B. N. Hood et al., "Estimating DoA From Radio-Frequency RSSI Measurements Using an Actuated Reflector," IEEE Sensors Journal, vol. 11, no. 2, pp. 413-417, February 2011.

[3] Gianni Giorgetti et al., "Single-Anchor Indoor Localization Using a Switched-Beam Antenna," IEEE Communications Letters, vol. 13, no. 1, pp. 1-3, January 2009.

[4] M. Passafiume et al., "On the duality of Phase-based and Phase-less RSSI MUSIC algorithm for Direction of Arrival estimation," Recent Advances in Electrical and Electronic Engineering, 2014.

The invention claimed is:

1. An apparatus for determining at least one piece of information on a position of a transmitter, comprising:
an antenna apparatus, a control apparatus and a data processing apparatus;
wherein the antenna apparatus comprises several different directional characteristics;
wherein the directional characteristics each relate to an amount of spatially different receive sensitivities of the antenna apparatus;
wherein the control apparatus influences the antenna apparatus such that several different directional characteristics of the antenna apparatus are activated;
wherein the antenna apparatus receives at least one signal originating from the transmitter for each activated directional characteristics; and
wherein the data processing apparatus processes the received signals and the amount of spatially different receive sensitivities allocated to the respectively activated directional characteristic of the different directional characteristics to provide an amount of weighted receive values related to the respectively activated directional characteristic, and wherein the data processing apparatus processes the amounts of weighted receive values related to the different directional characteristics together and determines the information on the position of the transmitter at least from the amounts of weighted receive values.

2. The apparatus according to claim 1,
wherein the data processing apparatus processes data describing the received signals and the amounts of spatially different receive sensitivities of the respectively activated directional characteristics each present as matrix together, in particular multiplies the same, in order to acquire the amounts of weighted receive values in the form of matrices.

3. The apparatus according to claim 1,
wherein the data processing apparatus adds up at least one group of the amounts of weighted receive values related to different directional characteristics.

4. The apparatus according to claim 1,
wherein the data processing apparatus adds up a group of the amounts of weighted receive values and determines the information on the position of the transmitter at least from an accumulation area of the received signals.

5. The apparatus according to claim 1,
wherein the data processing apparatus determines a difference at least between two groups of the amounts of the weighted receive values.

6. The apparatus according to claim 4,
wherein the data processing apparatus determines a presence of several transmitters from the difference at least between the two groups of the amounts of the weighted receive values.

7. The apparatus according to claim 1,
wherein the antenna apparatus is a multi-beam antenna comprising several beams, wherein the several beams are allocated to different directional characteristics, and wherein the directional characteristics of the antenna apparatus configured as multi-beam antenna differ from one another by a direction of the several beams of the multi-beam antenna.

8. The apparatus according to claim 6,
wherein the antenna apparatus configured as multi-beam antenna comprises an individual signal output for each switchable directional characteristic.

9. The apparatus according to claim 1,
wherein only the signal of one signal output of the antenna apparatus is available for the data processing apparatus per activated directional characteristic.

10. The apparatus according to claim 1,
wherein the signals of several signal outputs of the antenna apparatus are available for the data processing apparatus per activated directional characteristic.

11. The apparatus according to claim 1,
wherein the antenna apparatus emits at least one signal so that a signal originates from the transmitter.

12. The apparatus according to claim 1,
wherein the antenna apparatus and the data processing apparatus are configured to receive and to process signals reflected by the transmitter as signals originating from the transmitter.

13. The apparatus according to claim 1,
wherein the data processing apparatus presents the amounts of weighted receive values in a color-coded manner on at least one visualization apparatus.

* * * * *